March 3, 1953    M. N. FAIRBANK    2,630,050
FILM SPOOL-HOLDING MEANS

Original Filed May 13, 1948    2 SHEETS—SHEET 1

INVENTOR
Murry N. Fairbank
BY Donald L. Brown
Attorney

March 3, 1953 M. N. FAIRBANK 2,630,050
FILM SPOOL-HOLDING MEANS
Original Filed May 13, 1948 2 SHEETS—SHEET 2
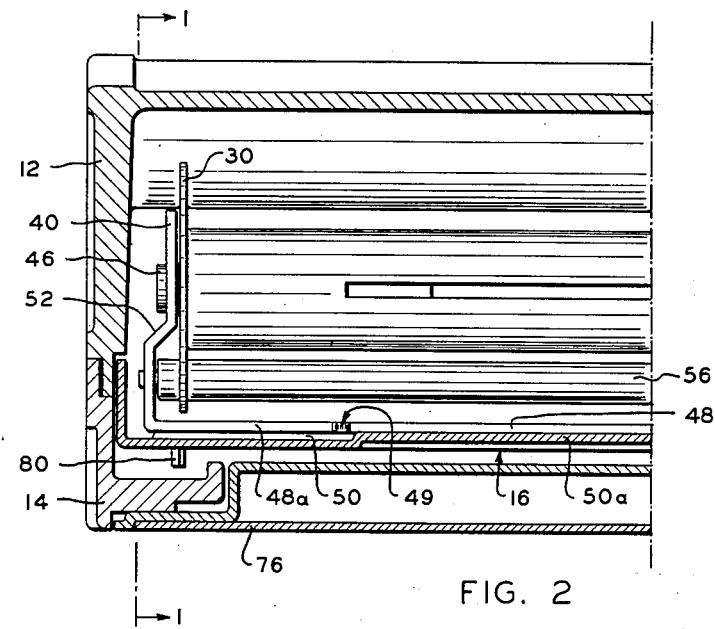
FIG. 2
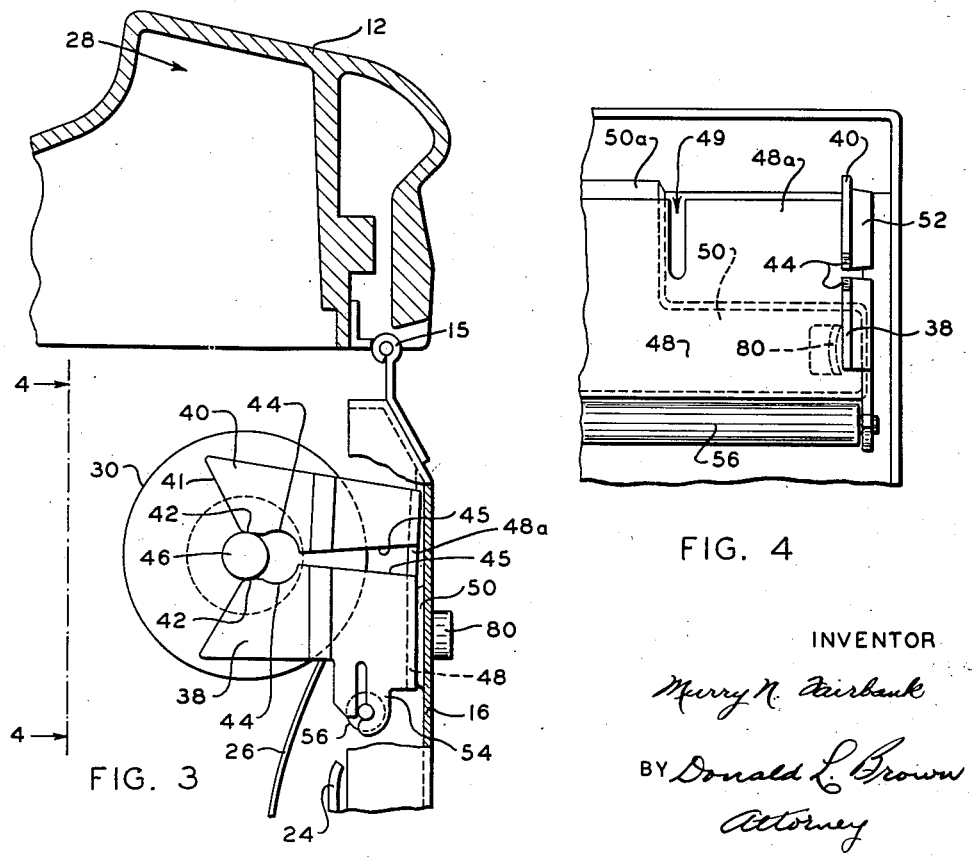
FIG. 3
FIG. 4
INVENTOR
Murry N. Fairbank
BY Donald L. Brown
Attorney Patented Mar. 3, 1953

2,630,050

UNITED STATES PATENT OFFICE 2,630,050

FILM SPOOL-HOLDING MEANS

Murry N. Fairbank, Belmont, Mass., assignor to Polaroid Corporation, Cambridge, Mass., a corporation of Delaware Original application May 13, 1948, Serial No. 26,800, now Patent No. 2,538,511, dated January 16, 1951. Divided and this application April 21, 1950, Serial No. 157,280

14 Claims. (Cl. 95—31)

This invention relates to photography and more particularly to novel photographic apparatus which is an improvement over that shown in Patent No. 2,435,717, which patent shows a photographic apparatus, such as a camera, wherein negative and positive sheets may be separately mounted in the camera, and negative and positive images may be concurrently produced in the two sheets by bringing said two sheets into face-to-face relation and releasing a liquid from one of said sheets and spreading said liquid between the two sheets.

This application is a division of my copending application, Serial No. 26,800, filed May 13, 1948, for Photographic Apparatus, now Patent No. 2,538,511 issued January 16, 1951.

A principal object of the present invention is to provide improved means for mounting a spool carrying a roll of photosensitive sheet.

Another object of the invention is to provide a mounting means which permits easy loading and removal of a spool of photosensitive film.

These and other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 2 is a sectional view of Fig. 1 taken along the line 2—2;

Fig. 3 is a fragmentary sectional view of the invention of Fig. 1 with the rear housing removed and the partition member swung partially open with the spool partially inserted in the holder; and Fig. 4 is a plan view of the spool holder and partition member looking in the direction 4—4 of Fig. 3, with the film spool removed.

Figure 1:
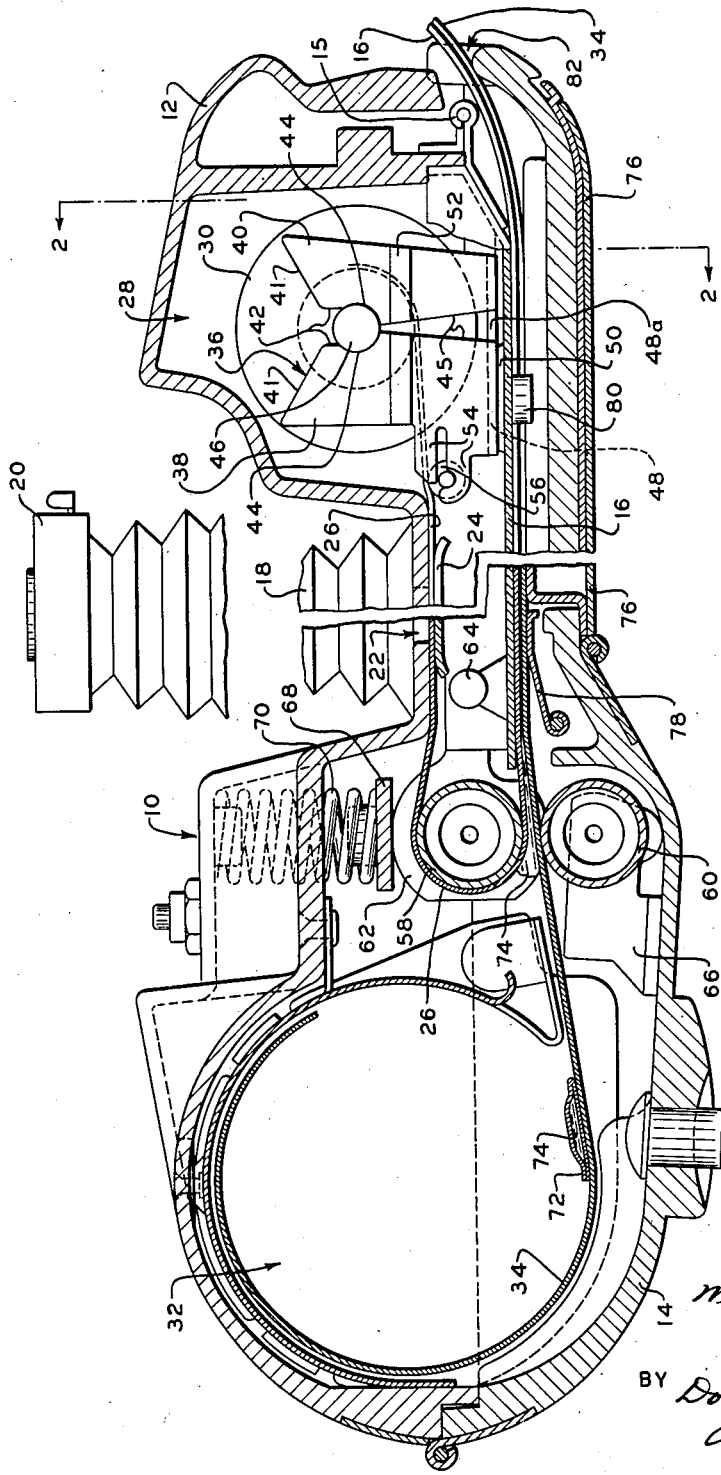
Figure 1 is a diagrammatic fragmentary sectional view of one preferred embodiment of the invention shown in the form of a hand-held camera, the right-hand portion of Fig. 1 being a section along line 1—1 of Fig. 2 and the left-hand portion of Fig. 1 being a section along the center of the camera.

In general, this invention relates to cameras of the type comprising means for holding a roll of photosensitive sheet such as a commercial silver halide photosensitive film, means for exposing sequential areas of the photosensitive film and means for processing the exposed silver halide area to at least develop a negative image therein, by spreading a processing liquid between the exposed area and another sheet also supplied by the camera. This second sheet preferably supports a plurality of liquid-carrying containers at spaced intervals on one surface thereof, this surface being brought into face-to-face relation with the exposed image area of the silver halide photosensitive film and the processing being accomplished by passing the thus superposed film and sheet between a pair of pressure rolls carried by the camera to cause the release and spreading of the liquid between corresponding areas of the film and sheet. The above processing preferably produces a positive image on the second sheet and this latter sheet is hereinafter referred to as a positive image-receiving sheet. The present invention is more particularly directed to improvements in the means for holding the spool of photosensitive film. These improvements are accomplished by several features of the invention involving the positioning of the spool-holding means and the construction thereof hereinafter described.

In the preferred form of camera embodying the present invention, there is preferably included a front housing carrying a lens and shutter assembly, a rear housing and a partition member between these housings, the partition member being preferably hinged to the front housing. The partition member defines an exposure chamber with the front housing and defines a dark chamber with the rear housing. The two housing members preferably provide a positive sheet-holding chamber between portions thereof. A pair of processing means, preferably a pair of pressure rolls, are included in the camera, one of the rolls being preferably carried by an end of the partition member and the other being preferably carried by the rear housing. A portion of the front housing is preferably enlarged to provide a space within which the spool of photosensitive film may be positioned. A spool holder is provided on the partition member and so holds the spool therein that, upon movement of the partition into operative relationship with the front housing, the spool is positioned within the space formed by the enlarged portion of the front housing. The spool holder preferably comprises a U-shaped member having bifurcated legs and a connecting yoke secured to the partition member.

Each of said bifurcated legs preferably comprises a pair of coplanar arms defining therebetween a slot having a widened circular portion in which the spindle of the spool may be held. The plane of the two arms of a pair is preferably normal to the spool axis and normal to the plane of the partition member while the connecting yoke is parallel to the plane of the partition member. This yoke is preferably so related to the partition member as to increase the resilience of one of the arms of each pair. Thus, when the spindle is inserted in the slot between these two arms, one of the arms is readily moved within its plane until the spindle reaches the widened circular portion of the slot, allowing the arm to move back to its original position and thus to lock the spool in place.

Referring now to Fig. 1 there is shown one preferred form of the invention as embodied in a hand-held camera. In this figure, 10 represents the camera generally, the camera being shown as comprising a front housing 12, a rear housing 14 and a partition member or spool holder supporting base 16, hingedly connected at 15 to front housing 12. The front housing supports a usual bellows 18 carrying a lens and shutter assembly schematically indicated at 20. For defining an exposure opening there is provided a hole 22 in front housing 12. Behind opening 22 there is positioned a backing plate 24 carried by the partition 16, the backing plate holding an area of a photosensitive film 26 in the focal plane of the camera. At one end of front housing 12 there is provided an enlarged portion defining a space 28 in which a spool 30 carrying the film may be positioned. At the other end of the front housing is a second enlarged portion defining a space 32 in which a coil of a receiving sheet 34 may be positioned.

For holding spool 30 there is provided a spool holder indicated generally at 36, this holder preferably comprising a U-shaped element having a yoke and two spool-end-engaging legs, one leg for each end of the spool. Reference to Figs. 2, 3 and 4, where like numbers refer to like elements, is helpful in an understanding of the construction shown. Each spool-engaging leg is preferably normal to partition 16 and comprises two coplanar arms indicated at 38 and 40. A slot between these arms is defined by facing edges of the arms 38 and 40, these being indicated at 42, 44 and 45. Edges 42 are substantially parallel, edges 44 are circular and edges 45 taper away from each other. The top portions 41 of arms 38 and 40 preferably define a wedge for guiding a spindle 46 of spool 30 into position (see Fig. 3), to be forced down into the slot defined by edges 42 until the spindle reaches the circular portion of the slot defined by edges 44. Arms 38 and 40 are preferably formed from a single sheet of metal having a connecting yoke 48 with which arms 38 and 40 are integrally connected. Yoke 48 preferably is parallel to partition 16 and that part 48a thereof, carrying arm 40, is spaced from partition 16. This spacing is accomplished, in the preferred construction, by providing a ridge 50 on the surface of partition 16. As seen best in Fig. 4, ridge 50 is preferably T-shaped, the leg of the T being shown at 50a. The major portion of the yoke 48 is fixedly secured to the upper surface of ridge 50—50a such as by spot welding. This leaves the right-hand end portion 48a of yoke 48, which supports arm 40, free for movement (as shown in Fig. 3) towards partition 16 under a bending stress applied thereto by a force exerted on arm 40. The outwardly tapering slot 45 between two arms 38 and 40 provides a relatively wide transverse area of yoke portion 48a which is capable of flexing over a large area, thereby having considerable flexibility. This arrangement permits the spool holder to be made of a relatively heavy stock, to provide the necessary structural rigidity, while permitting sufficient flexibility of portions thereof to provide for easy insertion and removal of the spool. A pair of slots 49 (see Fig. 4), extending partially across yoke 48, isolate the two portions 48a, supporting arms 40, from the central portion of the yoke secured to ridge 50a, to facilitate the flexing of the unsupported portions 48a of the yoke. The areas separating unsupported yoke portions 48a from the remainder of yoke 48 may be termed areas of flexure.

As can be seen more clearly from Fig. 2, each of arms 38 and 40 preferably has an inclined intermediate portion 52 which holds upper portions of each arm in a plane spaced inwardly of the plane of the lower portions. This spacing decreases the area of these arms which can contact the flange on the spool and accurately positions the spool transversely of the camera. Arm 38 of the spool holder also preferably includes a means for supporting the photosensitive layer as it is unrolled from the spool. In a preferred form, this supporting means comprises a roll 56 which is suitably secured to the spool holder, such as by means of a pair of forwardly extending arms shown at 54 which engage one end of roll 56 and maintain the roll 56 fixed with respect to the focal plane when the partition 16 is in its closed position. Roll 56 guides the photosensitive film into the focal plane of the camera at such an angle that back tension on the film does not rock the backing plate 24.

For accomplishing the processing of the exposed area of photosensitive film 26 there is provided a processing means shown, in a preferred form, as comprising a pair of pressure rolls 58 and 60. Roll 58 is carried by a pair of arms 62 supported by a hinge 64 secured to partition 16. Roll 60 is preferably carried by a support 66 secured to rear cover 14. For applying a resilient load to rolls 58—60 there is preferably provided a pressure member 68 bearing on arms 62 and under a spring pressure due to a spring 70. A preferred form of receiving sheet 34 includes a container 72 on one surface thereof, this container carrying a processing liquid 74 therein, this liquid being preferably viscous and comprising an alkaline aqueous solution of a developer, a film-forming material and a silver halide solvent.

When this viscous liquid is released and spread between the film and receiving sheet it laminates these two elements together and concurrently forms a negative in the film and a positive on the receiving sheet. This processing takes place in the dark chamber defined by the rear housing 14 and the partition member 16. For permitting access to the dark chamber to remove the finished positive there is provided a door 76. When the door is opened a light seal blade 78 prevents passage of light to the pressure roll portion of the camera. For guiding the film in the dark chamber there is included a pair of tabs 80 stamped out of partition 16 and bent perpendicularly thereto. As can be seen best in Fig. 4, a portion of the yoke 48 of the spool holder covers the hole left by punching out the tab 80 and thus prevents light from passing to unexposed film when the door 76 is opened. Suitable other light seals and latches are provided for maintaining the light-tightness of the camera interior.

In the use of the camera described above, the rear housing 14 is swung open, thus allowing the partition 16 to be swung open as shown in Fig. 3. The spool 30 is then placed in the spool holder by placing the spindle 46 adjacent one of the tapered edges 41 and pushing the spool towards the partition 16, the tapered edge guiding the spindle into the slot defined by the two edges 42. As the spindle enters the slot it, being wider than the slot, forces arm 40 to the right, rotating it around the unsupported portion 48a of yoke 48, this movement of arm 40 being shown most clearly in Fig. 3. As the spindle 46 passes through the slot 42 and reaches the circular slot defined by edges 44, arm 40 swings back to its original position, thus locking the spool in place. A leader portion of the film is then led across roll 56, across backing plate 24, placed between the two arms 62 and led around pressure roll 58 carried by arms 62. The partition member 16 is then swung to the position shown in Fig. 1, the spool of film occupying the space 28 therefor. The coil of receiving sheet is now placed in the cylindrical space 32 therefor and a leader portion of the receiving sheet, preferably secured to the film leader, is aligned with the film leader, these two leaders being fed along the back of partition 16, between tabs 80, carried by the partition, and past the right-hand end of the camera. The rear housing is now swung to closed position, thus forming the dark chamber with the partition, bringing roll 60 into operative relationship with roll 58, and forming a mouth 82 with the front housing, the leader portions of the film and sheet extending through the mouth 82.

An unexposed frame of film 26 is now moved to exposure position behind opening 22, a corresponding area of receiving sheet being advanced so as to be superposable with the exposed film area, the proper position of these areas being preferably accomplished by a stop of the type shown in my copending application, Serial No. 15,138, filed March 16, 1948, now Patent No. 2,543,159. After exposure the two sheets are advanced, the container 72 preceding the exposed film area and the corresponding receiving sheet area between the pressure rolls, these rolls, releasing liquid 74 from the container and spreading it uniformly between these two areas to laminate these areas together and to develop the above-described negative and positive images. At the conclusion of the processing, after about a minute, the door 76 is opened and that portion of receiving sheet 34 containing the positive image is separated from the lamination, this separation being preferably aided by perforations surrounding the positive image area. This processing movement preferably moves the succeeding film area into exposure position and this succeeding area may be processed, after exposure, by pulling those portions of the preceding film and receiving sheet extending from mouth 82.

While a preferred construction of film-holding means, having numerous advantages of simplicity and cheapness of manufacture, has been shown, a number of modifications thereof are feasible within the scope of the invention. For example, ridge 50 on partition 16 can be a washer or other spacing means. Equally, ridge 50 can be eliminated if the portion 48a of yoke 48 is in a higher plane than the remainder of yoke 48. Such a modification of the invention may be accomplished, for example, by bending the portion 48a of yoke 48 upwardly or by forming yoke 48 of two separate pieces, the portion 48a being placed over the other portion. Equally, partition 16 may be dished out so as to leave a space below the yoke portion 48a to permit bending of portion 48a. Similarly, the ridge 50 can extend under the center line of yoke 48, thus allowing both arms 38 and 40 to be bent to the side. Equally, the left side of yoke 48 can be unsupported, thus allowing left arm 38 to move while arm 40 remains stationary. For ease of assembly, yoke 48 extends completely between the two pairs of arms 38 and 40. However, this yoke may comprise two separate pieces, one for supporting each pair of arms, in which case that portion of the yoke 48 between the two slots 49 can be eliminated.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a photographic device, a supporting partition mounted in said device, and means secured to said partition for holding a spool of photosensitive film, said spool-holding means comprising a pair of coplanar arms for engaging one end of said spool, the plane of said arms being normal to the spool axis, and a second pair of coplanar arms for engaging the other end of said spool, the plane of said second pair of arms being substantially parallel to the plane of said first pair of arms, one arm of each pair being mounted for resilient movement in the plane thereof with respect to the other arm of the pair and said partition, said resilient mounting comprising a portion integral with both arms of a pair and substantially normal to the plane of said arms, said portion being secured to said partition so that a part thereof is spaced from said partition and free to move towards said partition, said free part carrying said resiliently mounted arm.

2. In a photographic device, a supporting partition mounted in said device, and means secured to said partition for holding a spool of photosensitive film, said spool-holding means comprising a substantially rectangular U-shaped member having bifurcated arms and a connecting yoke secured to said partition, a portion of said yoke parallel to said partition being spaced from and free for rotation towards said partition, said partition having a ridge extending above the plane of said partition, said yoke being secured to said ridge so that said free portion thereof overhangs a transverse edge of said ridge.

3. In a photographic device, a supporting base mounted in said device, and means secured to said base for holding a spool of photosensitive film, said spool-holding means comprising a pair of arms substantially normal to said base for engaging one end of said spool, and a member extending parallel to said base for supporting said arms, a portion of said member being secured to said base and another portion of said member being spaced from said base to permit movement of said latter portion towards said base, that arm of said pair connected to said last-named portion being movable with respect to the other arm of the pair due to said arrangement of elements, facing edges of said two arms defining a slot therebetween, a portion of said slot being circular and having a diameter substantially equal to the diameter of a spindle on said spool, portions of said slot above and below said circular portion being narrower than said diameter.

4. In a photographic device, means for holding a spool of photosensitive film, said spool-holding means comprising a pair of arms for engaging one end of said spool and a second pair of arms for engaging the other end of said spool, one of said arms of each pair being mounted for resilient movement with respect to the other arm of the pair, one arm of each pair including means for supporting a film-guiding roll.

5. In a photographic device, means for holding a spool of photosensitive film, said spool-holding means comprising a pair of arms for engaging one end of said spool, a second pair of arms for engaging the other end of said spool, one of said arms of each pair being mounted for resilient movement with respect to the other arm of the pair, one arm of each pair including means for supporting a film-guiding roll, and a film-guiding roll supported by said last-named arms.

6. In a photographic device, a flat supporting base mounted in said device, and means secured to said base for holding a spool of photosensitive film, said spool-holding means comprising a pair of coplanar arms for engaging one end of said spool, the plane of said arms being normal to the spool axis, and a second pair of coplanar arms for engaging the other end of said spool, the plane of said second pair of arms being substantially parallel to the plane of said first pair of arms, one arm of each pair being mounted for resilient movement in the plane thereof with respect to the other arm of the pair and said base, said resilient mounting comprising a yoke integral with both arms of a pair and substantially normal to the plane of said arms, said yoke being secured to said base so that parts of said yoke are spaced from said base, said spacing being effected by a pair of slots extending partially across said yoke in a direction normal to said spool axis whereby said spaced parts are free to move towards said base, said spaced parts carrying said resiliently mounted arms.

7. In a camera comprising a front housing and a member defining an exposure chamber with said front housing, the combination therewith of means, secured to that side of said member nearest said front housing, for holding a spool of photosensitive film, said spool-holding means comprising a pair of substantially coplanar arms for engaging one end of said spool, the plane of said arms being normal to the spool axis, and a second pair of substantially coplanar arms for engaging the other end of said spool, the plane of said second pair of arms being substantially parallel to the plane of said first pair of arms, one arm of each pair being mounted for resilient movement in the plane thereof with respect to the other arm of the pair and said member, said resilient mounting comprising a yoke affixed to both arms of both pairs and extending substantially perpendicularly to the planes of said arms, said yoke being secured to said member so that parts of said yoke are spaced from said member, said spaced parts being affixed to said resiliently mounted arms.

8. In a camera comprising a front housing, a member defining an exposure chamber with said front housing, and an exposure opening in said front housing, said exposure opening having a focal plane within said exposure chamber, the combination therewith of means, secured to that side of said member forming an inner wall of said exposure chamber, for holding a spool of photosensitive film, said spool-holding means comprising a pair of coplanar arms for engaging one end of said spool, the plane of said arms being normal to the spool axis, and a second pair of coplanar arms for engaging the other end of said spool, the plane of said second pair of arms being substantially parallel to the plane of said first pair of arms, one arm of each pair including means for supporting a film-guiding roll, that surface of said film-guiding roll farthest from said member being in substantial tangentiality with said focal plane, one arm of each pair being mounted for resilient movement in the plane thereof with respect to the other arm of the pair and said member, said resilient mounting comprising a yoke integral with both arms of both pairs and substantially normal to the planes of said arms, said yoke being secured to said member so that parts of said yoke are spaced from said member, said spacing being effected by a pair of slots extending partially across said yoke in a direction normal to said spool axis whereby said spaced parts are free to move towards said member, said spaced parts carrying said resiliently mounted arms.

9. In a camera comprising a front housing, a member defining an exposure chamber with said front housing, and an exposure opening in said front housing, said exposure opening having a focal plane within said exposure chamber, the combination therewith of means, secured to that side of said member forming an inner wall of said exposure chamber, for holding a spool of photosensitive film, said spool-holding means comprising a pair of coplanar arms for engaging one end of said spool, the plane of said arms being normal to the spool axis, a second pair of coplanar arms for engaging the other end of said spool, the plane of said second pair of arms being substantially parallel to the plane of said first pair of arms, one arm of each pair including means for supporting a film-guiding roll, that surface of said film-guiding roll farthest from said member being in substantial tangentiality with said focal plane, and a film-guiding roll supported by said last-named arms, one arm of each pair being mounted for resilient movement in the plane thereof with respect to the other arm of the pair and said member, said resilient mounting comprising a yoke integral with both arms of both pairs and substantially normal to the planes of said arms, said yoke being secured to said member so that parts of said yoke are spaced from said member, said spacing being effected by a pair of slots extending partially across said yoke in a direction normal to said spool axis whereby said spaced parts are free to move towards said member, said spaced parts carrying said resiliently mounted arms.

10. In a camera comprising a front housing member and another member defining an exposure chamber with said front housing member, the combination therewith of means, secured to that surface of one of said members adjacent the other of said members, for holding a spool of photosensitive film, said spool-holding means comprising a pair of substantially coplanar arms for engaging a spindle on one end of said spool, the plane of said arms being substantially normal to the spool axis, and a second pair of substantially coplanar arms for engaging a spindle on the other end of said spool, the plane of said second pair of arms being substantially parallel to the plane of said first pair of arms, one arm of each pair being mounted for resilient movement substantially in the plane thereof with respect to the other arm of the pair and with respect to that surface of the member to which said spool-holding means is secured, said resilient mounting comprising a yoke affixed to both arms of both pairs and extending substantially normal to the planes of said arms, said yoke being secured to said surface with parts of said yoke being spaced from said surface, said one arm of each pair being affixed to one each of said parts, said yoke having a pair of slots, each of which extends through an edge of said yoke, said slots defining portions of the boundaries of said parts whereby said parts are free to move toward and away from said surface.

11. In a camera comprising a front housing member and another member defining an exposure chamber with said front housing member, the combination therewith of means, secured to that surface of one of said members adjacent the other of said members, for holding a spool of photosensitive film, said spool-holding means comprising a pair of coplanar arms for engaging a spindle on one end of said spool, the plane of said arms being normal to the spool axis, and a second pair of coplanar arms for engaging a spindle on the other end of said spool, the plane of said second pair of arms being substantially parallel to the plane of said first pair of arms, one arm of each pair being mounted for resilient movement in the plane thereof with respect to the other arm of the pair and with respect to that surface of the member to which said spool-holding means is secured, said resilient mounting comprising an element integral with both arms of a pair and substantially normal to the plane of said arms, said element being secured to said surface so that parts of said element are spaced from said surface whereby said spaced parts are free to move towards said surface, said spaced parts carrying said resiliently mounted arms.

12. A spool holder for a spool which rotates on a spindle, said spool holder comprising a resilient integral sheet metal member having a substantially flat yoke, a first leg at one end of said yoke extending in a plane perpendicular to said plane of said yoke and a second substantially similar leg extending from the opposite end of said yoke in a direction parallel to that of said first leg, each leg being split by a relatively narrow slot to form a pair of arms lying substantially in the same plane, the slot between the arms of said first leg and the slot between the arms of said second leg lying substantially in a plane which is perpendicular both to the plane of said yoke and to the ends of said yoke, said plane of said slots intersecting said yoke at areas of flexure, the slot between the arms of said first leg and the slot between the arms of said second leg having aligned, relatively enlarged openings intermediate their ends, said enlarged openings being adapted to receive the ends of said spindle whereby when the ends of said spindle are forced into said slots the arms of each leg pivot from each other, the yoke flexing at the areas of flexure, said arms locking said spindle in position when the ends of said spindle contact the edges of said enlarged openings.

13. The spool holder of claim 12 and a base plate for said spool holder, a spacing element on said base plate for supporting said holder, said yoke having a first portion contacting said spacing element and a second portion spaced from said spacing element and from said base plate, an area of flexure of said yoke lying between said first and second portions whereby said second portion of said yoke is free to pivot with respect to said first portion of said yoke.

14. The spool holder of claim 13 wherein said second portion is separated from said first portion by a slot which extends from one edge of said yoke to an area of flexure.

MURRY N. FAIRBANK.

REFERENCES CITED

The following references are of record in the file of this patent:

UNITED STATES PATENTS

| Number | Name | Date |
| --- | --- | --- |
| 399,921 | Norton | Mar. 19, 1889 |
| 665,691 | Mosher | Jan. 8, 1901 |
| 1,567,499 | Grandjean | Dec. 29, 1925 |

FOREIGN PATENTS

| Number | Country | Date |
| --- | --- | --- |
| 223,464 | Germany | June 25, 1910 |